United States Patent
Zises et al.

(10) Patent No.: US 9,881,331 B2
(45) Date of Patent: Jan. 30, 2018

(54) SYSTEMS AND METHODS FOR FACILITATING PURCHASE USING MERCHANDISE HOLDER

(71) Applicant: PAYPAL, INC., San Jose, CA (US)

(72) Inventors: Matthew S. Zises, San Jose, CA (US); German Scipioni, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 518 days.

(21) Appl. No.: 14/042,227

(22) Filed: Sep. 30, 2013

(65) Prior Publication Data

US 2015/0095168 A1   Apr. 2, 2015

(51) Int. Cl.
  G06Q 30/00   (2012.01)
  G06Q 30/06   (2012.01)
  G06Q 50/12   (2012.01)

(52) U.S. Cl.
  CPC ......... G06Q 30/0623 (2013.01); G06Q 50/12 (2013.01)

(58) Field of Classification Search
  CPC ..... G06Q 50/10; G06Q 30/0623; G06Q 50/12
  USPC ................................................ 235/381, 383
  See application file for complete search history.

(56) References Cited

U.S. PATENT DOCUMENTS

| | | | | |
|---|---|---|---|---|
| 7,353,136 B2* | 4/2008 | Vock | .................. | A43B 3/0005 702/173 |
| 7,432,454 B1* | 10/2008 | Sze | .................. | G01G 19/4146 128/921 |
| 2002/0170961 A1* | 11/2002 | Dickson | ................ | G06Q 20/10 235/380 |
| 2010/0052215 A1* | 3/2010 | Emond | ............ | B29C 45/14065 264/275 |
| 2014/0244409 A1* | 8/2014 | Nathanel | ............... | G06Q 50/12 705/15 |

* cited by examiner

*Primary Examiner* — Rokib Masud
(74) *Attorney, Agent, or Firm* — Drinker Biddle (57) ABSTRACT

A merchandise holder, e.g., a drink coaster or a food placemat, is used to facilitate the purchase of food or beverage placed on the holder. A customer may use a mobile device to scan a QR code on a merchandise holder to purchase a beverage. Further, the merchandise holder may include an RFID scanner to keep track of the food or beverages consumed by the customer. The RFID scanner of the merchandise holder may scan RFID tags attached to the food or beverages consumed by the customer. A payment account of the customer may be associated with the merchandise holder to pay for the food or beverages placed on the holder. Accordingly, a customer may use the merchandise holder to order, keep track of, and pay for the food or beverages consumed by the customer.

23 Claims, 7 Drawing Sheets

SYSTEMS AND METHODS FOR FACILITATING PURCHASE USING MERCHANDISE HOLDER

BACKGROUND

Field of the Invention

The present invention generally relates to systems and methods for facilitating purchase using merchandise holders.

Related Art

With modern technology, consumers have access to various marketplaces and merchants to make purchases. For example, goods and products are made available to consumers via not only brick-and-mortar stores but also online stores. Nevertheless, there remains some friction in making a purchase from a service oriented merchants, such as bars and restaurants in which food or beverages have to be purchased from and served by waiters or bartenders at the merchants. For example, depending on the availability of waiters, customers may have to wait to order or pay for the food or beverages. In a popular and crowded bar or restaurant, there may be substantial delay for a customer to order and pay for the food of beverage. This delay and inconvenience may hinder the consumer from making a purchase at the bar or restaurant. Therefore, there is a need for a system or method that helps facilitate a purchase at a service oriented merchants, such as a bar or a restaurant.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a merchandise holder, e.g., a coaster, a placemat, or the like, may be used to facilitate the purchase of food or beverage placed on the holder. For example, a customer may use a mobile device to scan a QR code on a coaster to purchase a beverage. The beverage may then be delivered to the customer by using an identification of the customer.

In another embodiment, the merchandise holder may include an RFID scanner to keep track of the food or beverage consumed by the customer. For example, the RFID scanner on the merchandise holder may scan RFID tags attached to the food or beverage placed on the merchandise holder and consumed by the customer. The RFID tags may include information related to the food or beverage. A payment account of the customer may be associated with the merchandise holder to pay for the food or beverage placed on the holder. Accordingly, a customer may use the merchandise holder to order, keep track of, and pay for the food or beverage placed on the holder and consumed by the customer.

Figure 1:
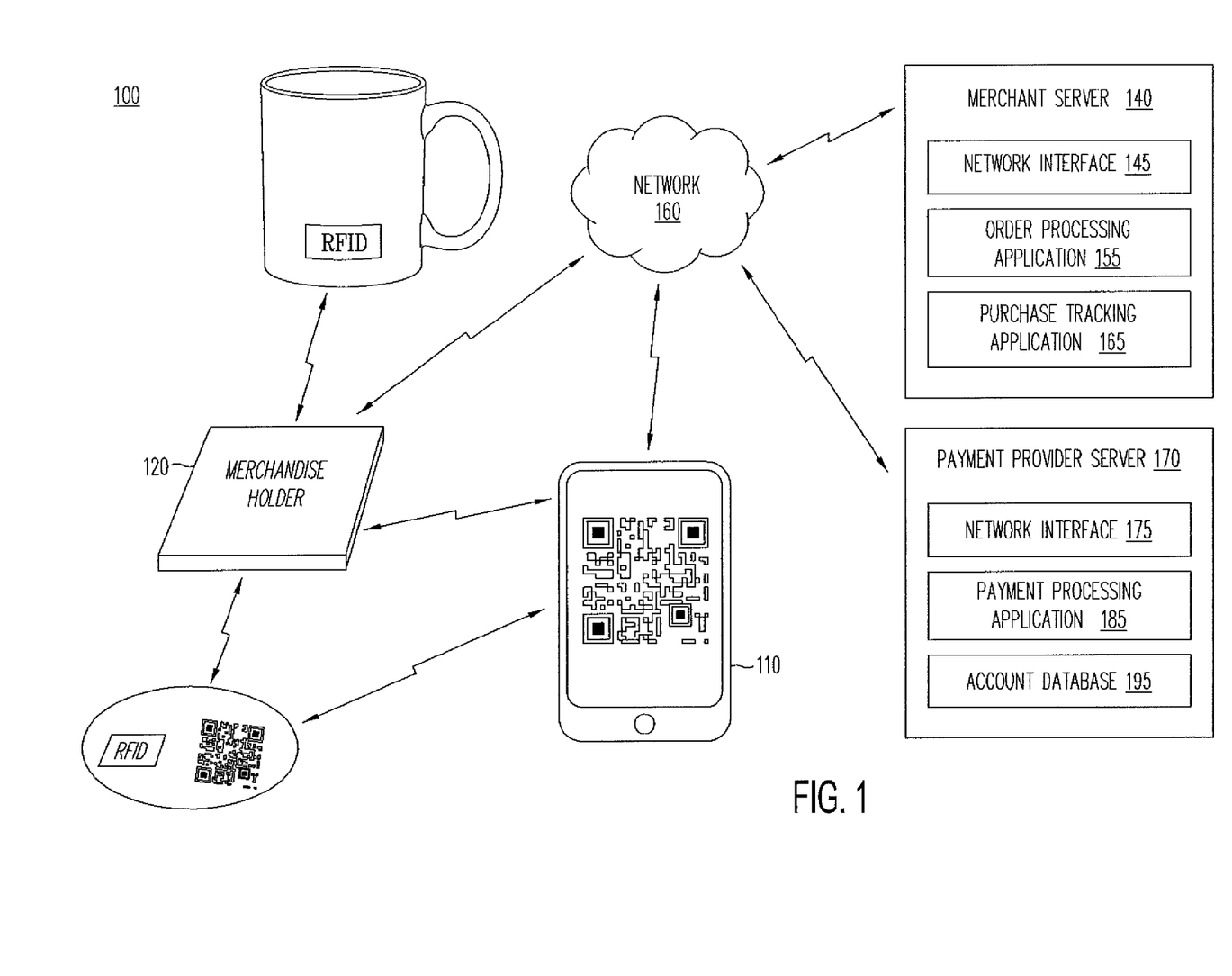
FIG. 1 is a block diagram of a networked system suitable for implementing a process for facilitating purchase using a merchandise holder according to an embodiment.

FIG. 1 is a block diagram of a networked system 100 suitable for implementing a process for facilitating a purchase using a merchandise holder according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchandise holder 120, a merchant server 140, and a payment provider server 170 in communication over a network 160. Payment provider server 170 may be maintained by a payment service provider, such as PayPal, Inc. of San Jose, Calif. A user 105, such as a sender or customer, utilizes user device 110 to perform a transaction using payment provider server 170. A user may utilize user device 110 to initiate a payment transaction, receive a transaction approval request, or reply to the request. Note that transaction, as used herein, refers to any suitable action performed using the user device, including payments, transfer of information, display of information, etc. For example, user may utilize user device 110 to purchase a beverage placed on merchandise holder 120. Although only one merchant server is shown, a plurality of merchant servers may be utilized if the user is purchasing products or services from multiple merchants.

User device 110, merchandise holder 120, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications which may be used, for example, to provide a convenient interface to permit a user to browse information available over network 160. For example, user device 110 may include a web browser configured to view information available over the Internet, such as a user account for setting up a shopping list and/or merchant sites for viewing and purchasing products and services. User device 110 may also include one or more toolbar applications which may be used, for example, to provide client-side processing for performing desired tasks in response to operations selected by the user.

User device 110 may further include other applications as may be desired in particular embodiments to provide desired features to user device 110. For example, other applications may include security applications for implementing client-side security features, programmatic client applications for interfacing with appropriate application programming interfaces (APIs) over network 160, or other types of applications.

User device 110 may also include email, texting, voice and IM applications that allow the user to send and receive emails, calls, and texts through network 160, as well as applications that enable the user to communicate, transfer information, make payments, and otherwise utilize a smart wallet through the payment provider as discussed above. User device 110 may include one or more user identifiers which may be implemented, for example, as operating system registry entries, cookies associated with browser application, identifiers associated with hardware of user device 110, or other appropriate identifiers, such as used for payment/user/device authentication. In one embodiment, the user identifier may be used by a payment service provider to associate the user with a particular account maintained by the payment provider. User device 110 may include a communications application with associated interfaces that enable user device 110 to communicate within system 100 via wired line or wireless communications.

User device 110 also may include an application that scans a Quick Response (QR) code or a bar code. For example, user device 110 may include a camera configured to scan an image of a QR code or a bar code. User device 110 may analyze and decode the QR code or the bar code to perform certain functions, e.g., purchase transactions. User device 110 may also include a Bluetooth communication device configured to communicate with another Bluetooth enabled device. For example, user device 110 may communicate with merchandise holder 120 via Bluetooth communication to facilitate purchase.

Merchandise holder 120 may be managed by a merchant. For example, merchandise holder 120 may be registered with merchant server 140. Further, merchandise holder 120 may be associated with a customer or a customer's payment account. Thus, merchant server 140 may use merchandise holder 120 to keep track of the customer's purchase. Merchandise holder 120 may have a top surface configured to hold a bottle or a glass of drink In an embodiment, merchandise holder 120 may be a placemat with a top surface configured to hold bowls or plates of food items. Merchandise holder 120 may include an RFID scanner configured to detect and read RFID tags attached to the drinks or the food items. For example, the RFID scanner may detect and read RFID tags attached to food items or beverages placed on merchandise holder 120. The RFID scanner may have a specific detection range such that merchandise holder 120 may detect and read the RFID tags on the food or beverages placed on merchandise holder 120 without detecting or reading other nearby RFID tags. For example, the RFID scanner may be disposed below the top surface of merchandise holder 120. Merchandise holder 120 may be configured to scan in a direction toward the top surface of the merchandise holder 120 and have a scanning range of approximately an inch above the top surface. Thus, the RFID scanner may scan the drinks or food items placed on merchandise holder 120 without scanning other items near merchandise holder 120, such as items inadvertently placed near the merchandise holder.

Merchandise holder 120 may have a communication device configured to send and receive information via Bluetooth and/or Wifi communication. For example, merchandise holder 120 may send information regarding the food or beverage placed on merchandise holder 120 to user device 110 to update and keep track of the food or beverage consumed by the user. Merchandise holder 120 also may communicate with merchant server 140 via network 160 to update items purchased by the user.

Merchandise holder 120 may be a drink coaster or a food placemat configured to hold food or drinks for a customer. In still another embodiment, merchandise holder 120 may be a shopping basket, a shopping cart, a shopping tray or any item that may accompany a customer during the customer's visit to the merchant. For example, merchandise holder 120 may be configured to accompany a customer and hold merchandise items to be purchased by the customer. The merchandise items may be consumable items, such as food or drinks, or other products, such as souvenirs, key chains, or clothes.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. In particular, merchant server 140 may be maintained by food service merchants, such as bars or restaurants.

Merchant server 140 may include a database identifying available products (including digital goods) and/or services (e.g., collectively referred to as items) which may be made available for viewing and purchase by a customer. Accordingly, merchant server 140 also may include a marketplace application which may be configured to serve information over network 160 to the browser of user device 110. In one embodiment, a user may interact with the marketplace application through browser applications over network 160 in order to view various products, food items, or services offered by the merchant.

Merchant server 140 also may include an order processing application 155 which may be configured to facilitate the ordering and purchase of goods or services online or at a physical POS or store front. For example, order processing application 155 may process food or drink orders from customers received via merchandise holder 120. Order processing application 155 may notify staff of the merchant to prepare and deliver food or drinks to the customers based on the orders.

Order processing application 155 may be configured to accept payment information from payment service provider server 170 over network 160. For example, order processing application 155 may receive and process a payment confirmation from payment service provider server 170, as well as transmit transaction information to the payment provider and receive information from the payment provider (e.g., a transaction ID). Order processing application 155 may be configured to receive payment via a plurality of payment methods including cash, credit cards, debit cards, checks, money orders, or the like.

Merchant server 140 may include a network interface 145 configured to facilitate communication with other devices via network 160. Further, merchant server 140 may include a purchase tracking application 165 configured to keep track of purchases made by various customers. Purchase tracking application 165 may store customer accounts including information regarding customer profiles, purchase orders, payment accounts, and the like for facilitating and keeping track of purchase transactions of customers.

Payment provider server 170 may be maintained, for example, by an online payment service provider which may provide payment between a customer and the operator of merchant server 140. In this regard, payment provider server 170 includes one or more payment processing applications 185 which may be configured to interact with user device 110 and/or merchant server 140 over network 160 to facilitate the purchase of goods or services, communicate/display information, and send payments by user device 110.

Payment provider server 170 also may include an account database 195 configured to maintain a plurality of user accounts, each of which may include account information associated with customers, merchants, and funding sources, such as banks or credit card companies. For example, account information may include private financial information of users of devices such as account numbers, passwords, device identifiers, user names, phone numbers, credit card information, bank information, or other financial information which may be used to facilitate online transactions by users. Account information may also include identification of merchandise holder 120 associated with a user. Thus, purchases made via merchandise holder 120 may be charged to the payment account of the user.

Payment processing application 185 may be configured to interact with merchant server 140 on behalf of a user during a transaction to track and manage purchases made by the user and which and when funding sources are used. Payment processing application 185 may be configured to determine the existence of and to manage accounts for a user, as well as create new accounts if necessary. A network interface 175 may be configured to send or receive information to or from user device 110 and/or merchant server 140.

Figure 2:
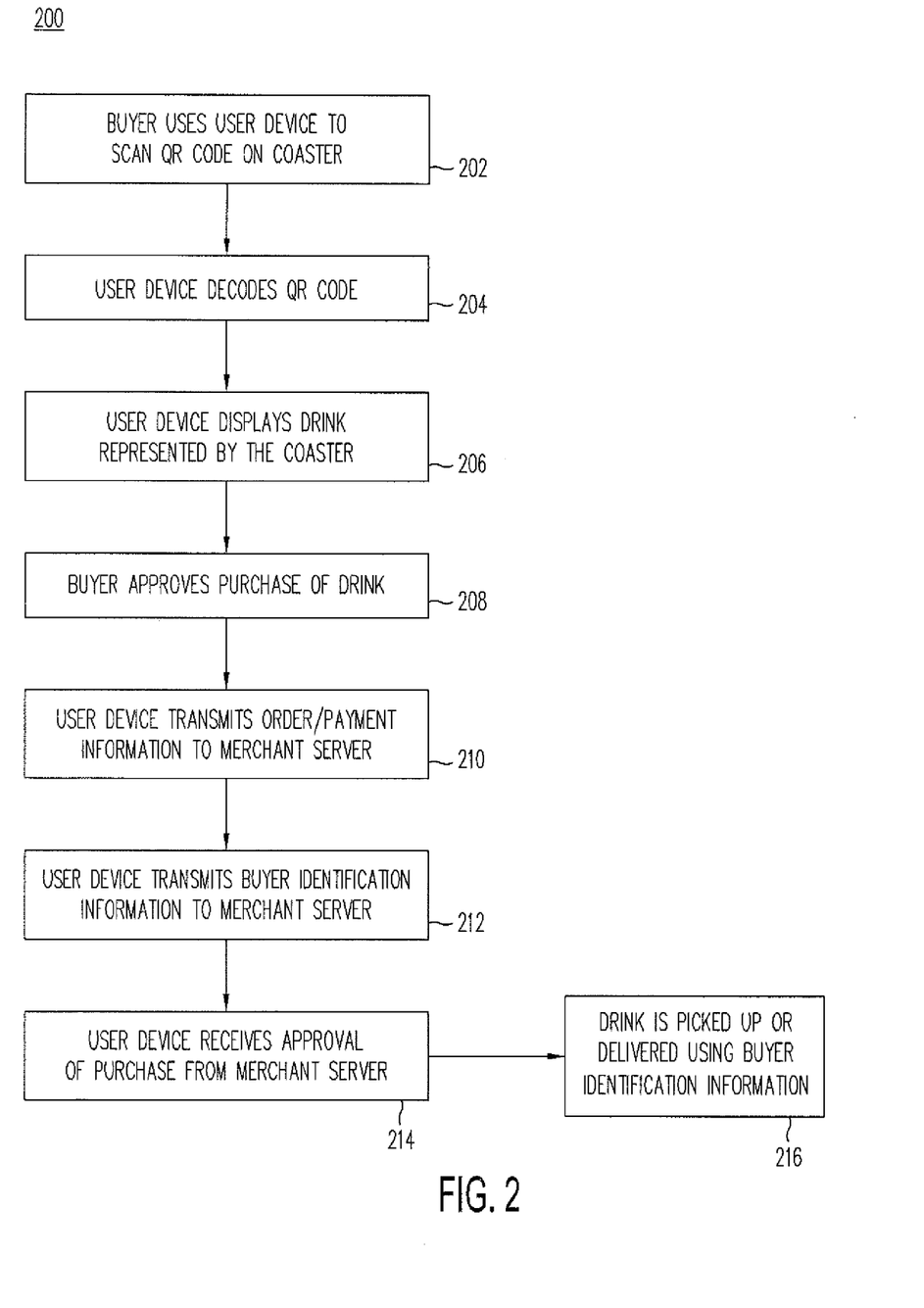
FIG. 2 is a flowchart showing a process for making a purchase using a merchandise holder with a QR code according to one embodiment.

FIG. 2 is a flowchart showing a process 200 for making a purchase using a merchandize holder with a QR code according to one embodiment. At step 202, a customer may use user device 110 to scan a code, e.g., a QR code or a bar code, printed on a coaster. For example, when a customer at a bar or restaurant wishes to order food or beverage, the customer may point a camera of user device 110 to scan the QR code on the coaster placed on the customer's table. The QR code may represent a specific food or beverage and the coaster may have a picture of the specific food or beverage. Thus, the customer may scan the QR code to purchase the specific food or beverage shown on the coaster.

A variety of coasters each representing a beverage or food item may be available to customers at the merchant's bar or restaurant. A customer may select a coaster representing a desired beverage and may scan a QR code printed on the coaster when the customer wishes to order a drink. When the customer finishes a drink, the customer may scan the QR code on the coaster again to order another drink.

At step 204, user device 110 may receive the scanned image of the QR code or bar code and begin to decode the QR code or bar code. At step 206, based on the decoded QR code or bar code, user device 110 may identify the beverage to be purchased and display the beverage to the customer. In one embodiment, the code may include a Universal Resource Locator (URL) of a product page of the merchant listing food or beverage offered at the merchant. The code may direct the user device 110 to visit the product page of the merchant. User device 110 may display the product page showing beverages offered by the merchant and allow the customer to choose the desired beverage to purchase.

At step 208, the customer may choose and approve the purchase of a beverage using user device 110. At step 210, user device 110 may send the order and payment information to merchant server 140. For example, user device 110 may send the information regarding the beverage to be purchased and the method of payment selected by the customer to merchant server 140. At step 212, user device 110 also may send the identification information of the customer to merchant server 140. For example, a name and a picture of the customer may be sent to merchant server 140. In an embodiment, the coaster may be associated with a location or table number of the customer and the location or the table number may be forwarded to merchant server 140.

At step 214, assuming that the payment information of the customer is valid, user device 110 may receive a confirmation from merchant server 140 that the purchase transaction has been approved. Thus, the customer may be notified that the purchase is completed and that the food or beverage will be served to the customer in due time. At step 216, the purchased beverage may be delivered to the user based on the identification information of the user. For example, a waiter at the merchant may deliver the purchased beverage to the user based on a picture of the user or the table number of the user. In one embodiment, the customer may pick up the purchased beverage from a bar counter and a bartender may recognize the customer based on the customer's picture.

According to the above process, the customer may order a beverage by scanning a coaster without waiting for the waiter. Further, the waiter may receive the order electronically from merchant server 140 along with the identification information of the customer, such that the waiter may deliver the purchase beverage to the customer based on the identification information. In addition, the payment for the beverage is processed during the ordering process, such that the waiter need not keep track of or process the payment at the end of the customer's visit. Therefore, the above process may improve the order and payment process for purchases made at a service-oriented merchant for both the customer and the merchant.

Figure 3:
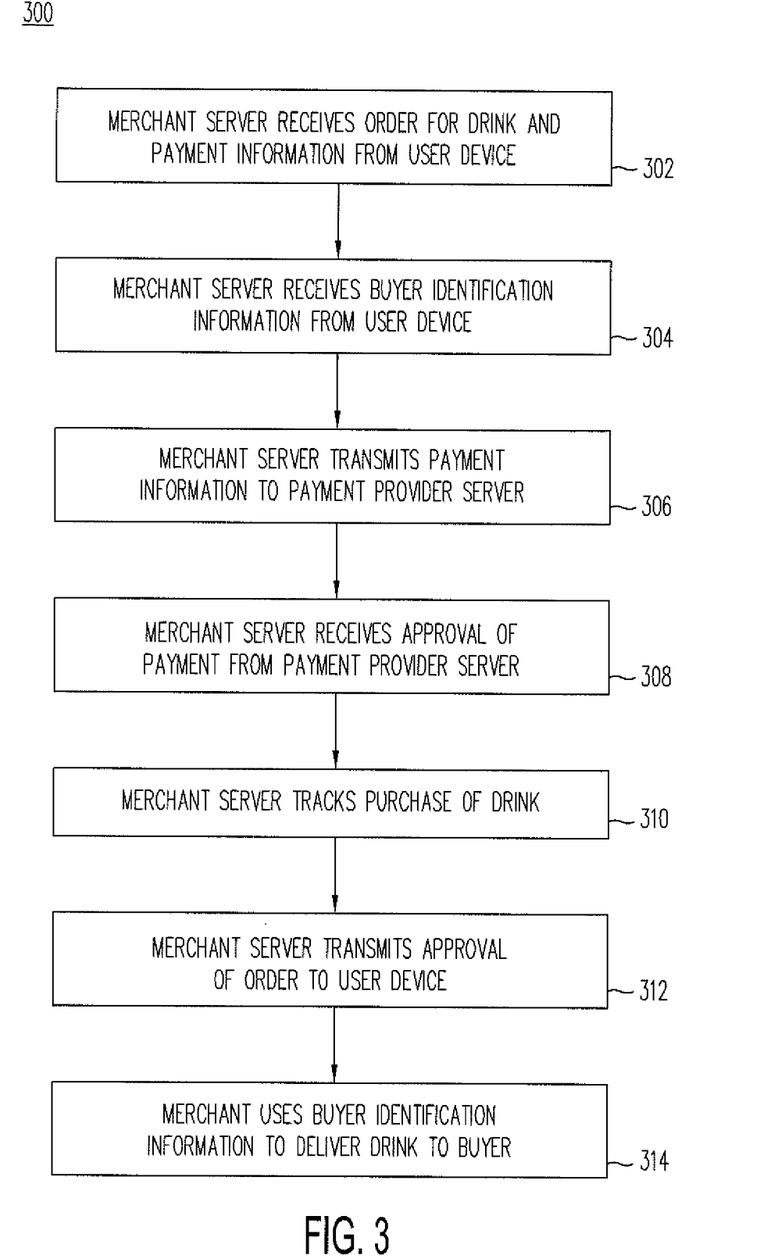
FIG. 3 is a flowchart showing a process for facilitating a purchase made using a merchandise holder with a QR code according to one embodiment.

FIG. 3 is a flowchart showing a process 300 for facilitating a purchase made using a coaster with a QR code according to one embodiment. At step 302, merchant server 140 may receive a purchasing order for a beverage and payment information from user device 110. As noted above, user device 110 may scan a QR code on a coaster to purchase a beverage. The purchasing order may identify the beverage to be purchased. At step 304, merchant server 140 may receive the customer's identification from user device 110. As noted above, a picture of the customer or a location, e.g., table number, of the customer may be sent to merchant server 140.

At step 306, merchant server 140 may send the payment information to payment provider server 170. For example, the payment information may include a method of payment and a payment account information associated with the customer. The payment information also may include information regarding the purchased amount and the purchased beverage. At step 308, merchant server 140 may receive an approval of payment from payment provider server 170. For example, after payment provider server 170 completes processing the payment for the purchased beverage, payment provider server 170 may send a confirmation to merchant server 140 to indicate approval of the payment.

At step 310, merchant server 140 may track purchases of beverages made by the customer. For example, merchant server 140 may continue to keep track of other purchases of food or beverage by the same customer during the customer's visit to the merchant. Thus, the customer may use user device 110 to scan multiple QR codes to purchase multiple food items or beverages during the customer's visit at the merchant's bar or restaurant.

At step 312, merchant server 140 may transmit approval of the order to user device 110. For example, merchant server 140 may send a confirmation to user device 110 to notify the customer that the purchased order has been received and completed and that the purchased items will be delivered to the customer in due time. At step 314, a waiter at the merchant may prepare the purchased beverage and may deliver the beverage to the customer based on the identification information of the customer. For example, based on a picture of the customer or location information, e.g., table number, of the customer, the purchased beverage may be delivered to the customer.

Accordingly, the merchant may receive the customer's order electronically without the waiter taking orders from the customer. Moreover, the merchant may keep track of the customer's purchase and process payment for the purchased items electronically. In addition, the merchant may serve the purchased items to the customer based on the identification information of the customer. These features allow the merchant to serve customers efficiently even when there is a shortage of staff in the merchant's bar or restaurants. Thus, customer satisfaction may be improved and sales may increase at the merchant's bar or restaurant.

Figure 4:
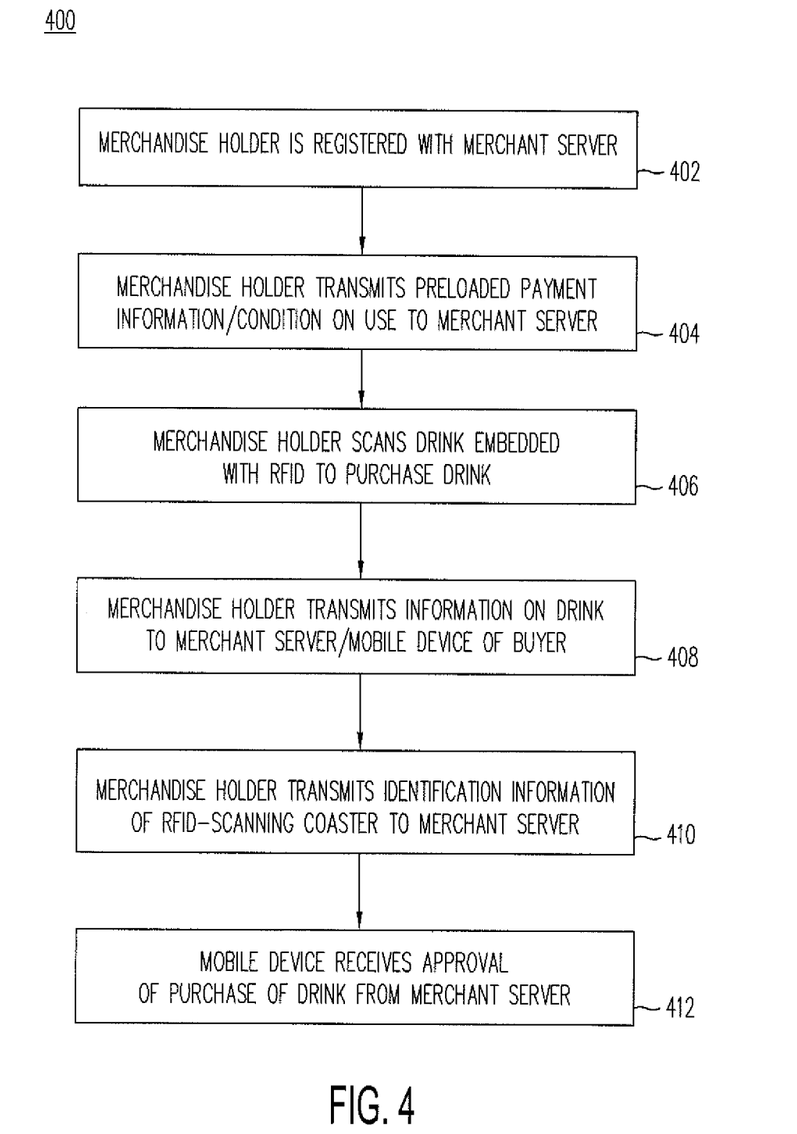
FIG. 4 is a flowchart showing a process for making a purchase using a merchandise holder with a Radio Frequency Identification (RFID) scanner according to one embodiment.

FIG. 4 is a flowchart showing a process 400 for making a purchase using a merchandise holder with an RFID scanner according to one embodiment. At step 402, merchandise holder 120 may be registered with merchant server 140. Merchandise holder 120 may include an RFID scanner/reader configured to scan/read an RFID tag attached to a beverage or a food item placed on merchandise holder 120. Merchandise holder 120 may be registered at merchant server 140 to be activated for use. For example, when a customer arrives at the merchant's bar or restaurant, a merchandise holder 120 may be activated for use by registering the merchandise holder 120 at merchant server 140. In an embodiment, merchandise holder 120 may be a placemat configured to hold food items or drinks.

At step 404, merchandise holder 120 may transmit preloaded payment information or condition on use to merchant server 140. For example, merchandise holder 120 may include preloaded payment information of a customer and condition on use of the customer. The condition on use of the customer may include conditions such as a maximum number of alcoholic drinks allowed, types of drinks allowed, a maximum amount of purchases allowed, a maximum amount of calories allowed, or the like. Thus, merchandise holder 120 may limit an amount of drinks or purchases made by the customer.

In an embodiment, when a customer arrives at a merchant's bar or restaurant, the customer may check out a merchandise holder 120 at the merchant's bar or restaurant and may associate merchandise holder 120 to the customer by connecting or syncing, e.g., via Bluetooth connection, merchandise holder 120 with the customer's user device 110. Thus, merchandise holder 120 may be associated with the customer or a payment account of the customer.

At step 406, merchandise holder 120 may detect and read an RFID tag attached to a drink placed on merchandise holder 120. For example, an RFID tag may be attached to a bottom of a drink. When the drink is placed on merchandise holder 120, the RFID tag attached to the drink may be detected and read by merchandise holder 120. The RFID tag may include information regarding the name, type, and price of the drink. Other information, such as nutritional information, e.g., a percentage of alcohol, sugar, carbohydrates, or calories of the drink, may also be included in the RFID tag. Thus, merchandise holder 120 may obtain information of the food items or drinks placed on merchandise holder 120. Merchandise holder 120 may have a specific RFID detection range and direction, such that RFID tags attached to the food items or drinks placed on merchandise holder 120 are detected, while other RFID tags near merchandise holder 120 are not detected.

At step 408, merchandise holder 120 may send the drink information received from the RFID tag of the drink to merchant server 140. For example, merchandise holder 120 may send the information, such as the time and date when the drink is placed on merchandise holder 120, the name and type of drink, price of the drink, amount of alcohol, calories, and the like to merchant server 140. For a food item placed on merchandise holder 120, the nutritional information of the food item also may be sent to merchant server 140.

At step 410, the identification information of merchandise holder 120 may be sent to merchant server 140. Thus, merchant server 140 may keep track of the drinks or food items consumed by the customer associated with merchandise holder 120. Further, merchant server 140 may process the purchase and payment for the consumed drinks or food items using a payment account of the customer at payment provider server 170.

At step 412, after the customer finishes the visit to or purchases at the bar or restaurant, merchant server 140 may process the bill for the drinks or food items consumed by the customer with payment provider server 170 and send user device 110 of the customer with a receipt or an approval of the purchase. Further, merchant server 140 may provide the customer with a summary of the visit including food items and drinks consumed, total nutritional amounts, and the like.

By using the above process, a merchant or a customer may use merchandise holder 120 to keep track of drinks or food items consumed by the customer. Further, the bill for the drinks or food items may automatically be processed and paid electronically for the customer.

Figure 5:
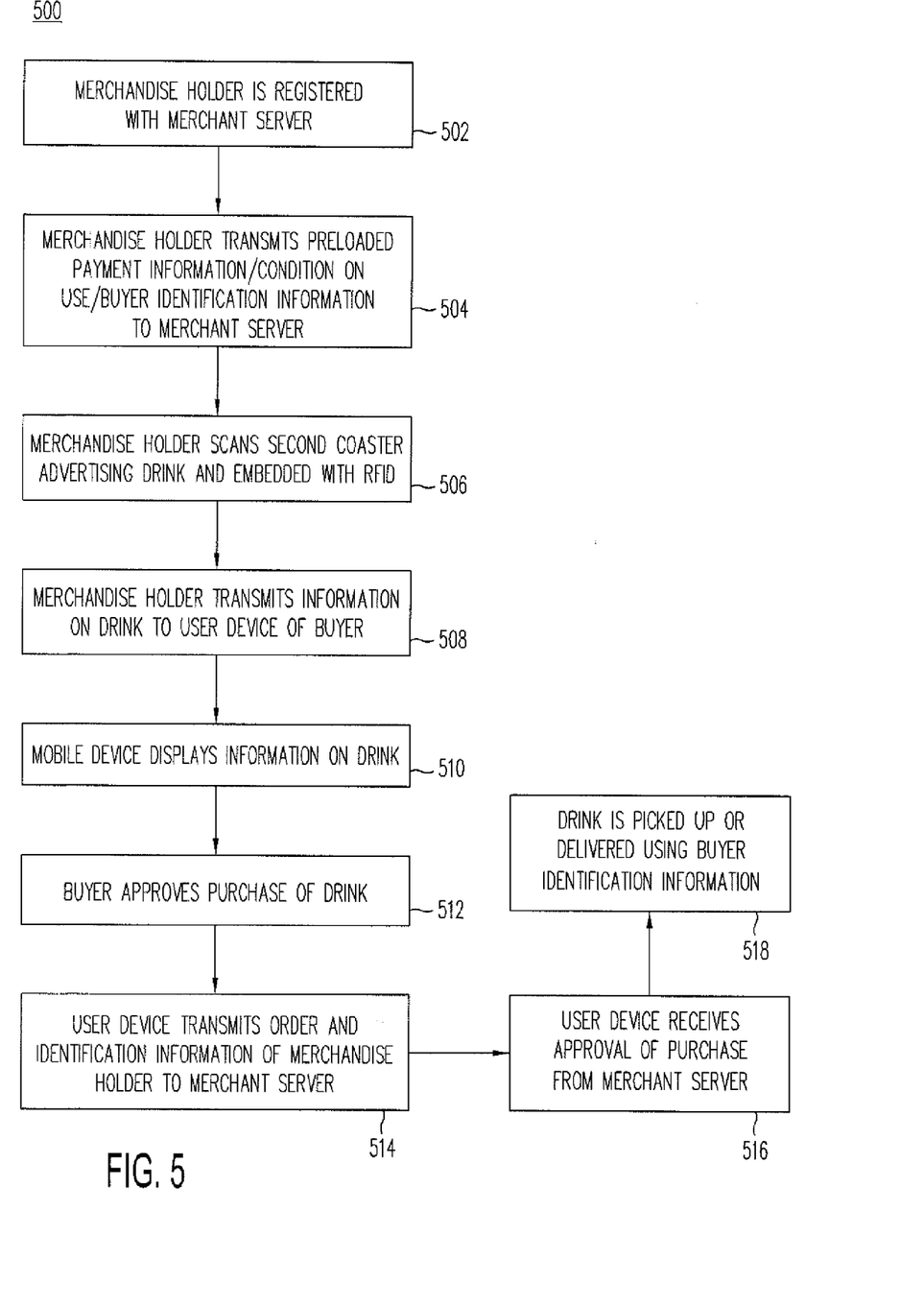
FIG. 5 is a flowchart showing a process for making a purchase using a merchandise holder with an RFID scanner and another merchandise holder with an RFID tag according to one embodiment.

FIG. 5 is a flowchart showing a process 500 for making a purchase using a merchandise holder and another coaster with an RFID tag according to one embodiment. At step 502, merchandise holder 120 may be registered with merchant server 140. For example, as noted above in step 402, when a customer arrives at the merchant's bar or restaurant, a merchandise holder 120 may be selected by the customer and activated for use by registering the merchandise holder 120 at merchant server 140.

At step 504, merchandise holder 120 may transmit preloaded payment information, condition on use, and customer identification information to merchant server 140. For example, as noted above in step 404, merchandise holder 120 may include preloaded payment information of a customer, condition on use of the customer, and customer identification information. At step 506, a second merchandise holder, e.g., a second coaster, with advertisement for a drink and an RFID tag representing the advertised drink may be scanned by merchandise holder 120. For example, the second coaster may have an advertisement including a picture and description of the drink. The customer may be enticed by the advertisement to purchase the drink shown on the second coaster. The customer may place the second coaster on merchandise holder 120. Merchandise holder 120 may detect and read the RFID tag embedded in the second coaster. The RFID tag embedded in the second coaster may include information indicating the advertised drink and a request for purchasing the drink.

At step 508, merchandise holder 120 may send the information of the drink to user device 110 of the customer. For example, merchandise holder 120 may scan the RFID tag embedded in the second coaster to obtain information of the drink advertised on the second coaster. The information of the drink may then be sent to user device 110. At step 510, user device 110 may display the information of the drink to the customer. For example, the RFID tag embedded in the second coaster may include a URL link of a product page for the advertised drink. Thus, user device 110 may use the URL link to access the product webpage of the advertised drink and display the webpage to the customer.

At step 512, the customer may review the information of the drink and may wish to purchase the drink. The customer may approve the purchase of the drink using user device 110. At step 514, user device 110 may send the purchase order for the drink and identification of merchandise holder 120 to merchant server 140. Merchant server 140 then may process the purchase order for the drink and payment for the drink using a payment account of the customer associated with merchandise holder 120. Further, merchant server 140 may process payment for the drink with payment provider server 170.

At step 516, user device 110 may receive a confirmation or approval of the purchase of the drink from merchant server 140. For example, after merchant server 140 completes processing the purchase order and payment for the purchase order with payment service provider 170, merchant server 140 may send a confirmation or approval to user device 110 to notify the customer that the purchase of the drink has been processed.

At step 518, a staff at the merchant may prepare the drink and deliver the drink to the customer based on the customer identification information, e.g., a picture of the customer. For example, a picture of the customer may be associated with the purchase order of the drink. The staff at the merchant's bar or restaurant may prepare and deliver the drink to the customer by using the picture of the customer to identify the customer in the bar or restaurant.

Accordingly, process 500 may facilitate a purchase of a beverage or food items advertised on a coaster. A customer may order the advertised beverage or food items without waiting for a waiter to take order from the customer. Further, the purchase may be automatically paid for electronically and the purchased beverage or food items may be delivered to the customer using the customer's identification information.

Figure 6:
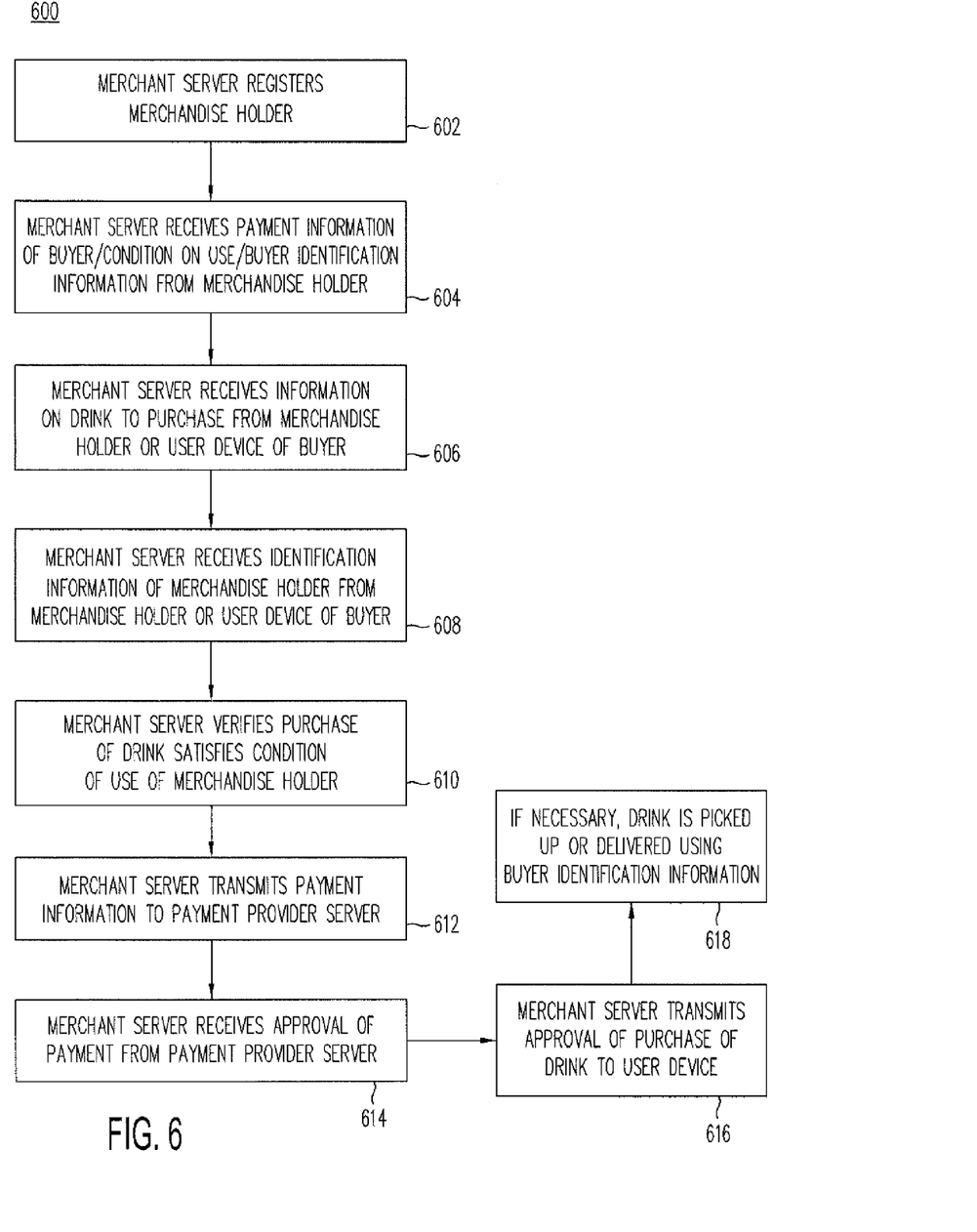
FIG. 6 is a flowchart showing a process for facilitating a purchase made using a merchandise holder with an RFID scanner according to one embodiment.

FIG. 6 is a flowchart showing a process 600 for facilitating a purchase made using a merchandise holder with an RFID scanner according to one embodiment. At step 602, merchant server 140 may register a merchandise holder 120. For example, as noted in steps 402 and 502, merchandise holder 120 may be registered with merchant server 140. Further, merchandise holder 120 may be associated with a customer or a payment account of the customer.

At step 604, merchant server 140 may receive payment information associate with the customer, condition on use, and customer identification information from merchandise holder 120. For example, as noted in step 504, the information associated with the customer may be preloaded on merchandise holder 120 and then sent to merchant server 140. At step 606, merchant server 140 may receive purchase information for a beverage or food item from merchandise holder 120 or from user device 110 of the customer. For example, the customer may order a beverage or food item by placing the beverage or food item on merchandise holder 120 or by placing another coaster with advertisement for a drink on merchandise holder 120. Merchandise holder 120 may scan the RFID tags and send the information of the beverage or food item to be purchased to merchant server 140 or user device 110.

At step 608, merchant server 140 may receive identification information of merchandise holder 120 from merchandise holder 120 or from user device 110. For example, the identification information, e.g., a unique RFID, may be sent to merchant server 140. Thus, merchant server 140 may use the identification information of merchandise holder 120 to associate drinks or food items placed on merchandise holder 120 with the customer or the payment account of the customer.

At step 610, merchant server 140 may verify whether the purchase satisfies the condition of use of merchandise holder 120. For example, merchant server 140 may determine whether a drink purchase exceeds a maximum amount, a maximum alcoholic amount, or a maximum calories amount for the customer. If the maximum amount has been reached, merchant server 140 may deny the purchase request.

At step 612, assuming that the condition on use is satisfied, merchant server 140 may send the payment information to payment provider server 170 to process payment for the purchased beverage or food items. Payment provider server 170 may process the payment for the purchase by debiting from the customer's payment account and crediting the merchant's account. At step 614, merchant server 140 may receive a confirmation or approval from payment provider server 170 indicating that the payment for the purchase has been completed. For example, after payment provider server 170 finishes processing the payment, payment provider server 170 may send a confirmation or an approval to merchant server 140.

At step 616, merchant server 140 then may send the approval or confirmation of payment to user device 110 to notify the customer that the purchase has been paid. At step 618, the purchased drink or food item may be delivered to the customer. For example, a waiter at the merchant's bar or restaurant may deliver the purchased beverage or food item to the customer based on a picture of the customer.

The above steps in processes 200-600 may be executed at one of user device 110, merchant server 140, and payment provider server 170. In one embodiment, one or more steps may be executed at user device 110 or merchant server 140 while other steps may be executed at payment provider server 170.

The following are exemplary scenarios in which the above processes 200-600 may be implemented.

Example 1

A customer visits a restaurant after work for a few drinks. The restaurant has a plurality of coasters each representing a different kind of beer. Each coaster has a name and picture of the beer it represents and a QR code identifying the beer. The customer picks up a coaster representing beer A, which is the customer's favorite drink. To order a glass of beer A, the customer uses a mobile phone to scan the QR code printed on the coaster representing beer A. The mobile phone decodes the QR code and displays beer A. The customer then uses the mobile phone to confirm purchase of beer A.

The mobile phone sends the purchase order for beer A to the restaurant's server. The mobile phone also sends a picture of the customer and the payment information of the customer to the restaurant's server. The restaurant's server then processes the purchase order. In particular, the restaurant's server processes payment for the purchase order by using a payment provider server. After the payment provider server approves the payment using the customer's payment account, the payment provider server confirms with the restaurant's server that the purchase order has been paid.

The restaurant's server then notifies a waiter at the restaurant to prepare a glass of beer A for the customer. The waiter delivers the glass of beer A to the customer by identifying the customer in the restaurant using the customer's picture. After the customer finishes the first glass of beer A, the customer may order another glass by scanning the QR code on the coaster again using the mobile phone.

Accordingly, the customer may order drinks without having to wait for the waiter to take the order when the restaurant is crowded. Further, ordering using the mobile phone allows the purchase and the payment to be done electronically. The customer may not have to wait for the waiter to pay for the drinks. Therefore, the customer experience is improved at the restaurant and the restaurant may realize additional business and sales.

Example 2

A customer visits a restaurant for dinner. The restaurant has RFID coasters or placemats for keeping track of purchases. The customer picks up an RFID placemats to keep track of food and drinks consumed by the customer. The customer associates the RFID placemats with the customer by synching the RFID placemat with the customer's mobile phone. The mobile phone sends customer's profile and payment information to the RFID placemat via Bluetooth communication. The RFID placemat receives the customer's payment information and the customer's diet preference, such as limits on calories and alcohol. The RFID placemat sends this information to the restaurant's server.

The placemat is placed on customer's dining table. Each drink and food item in the restaurant is attached with an RFID tag with identification and profile of the drink or food item. The customer orders a glass of wine, a salad, and a steak dinner. When the food items and the drink are placed on the RFID placemat, the RFID placemat detects and reads the RFID tags attached to the glass and plates of the drink and the food items. Thus, the RFID placemat identifies the food and drink ordered and consumed by the customer.

The RFID placemat sends information of the food and drink ordered and consumed by the customer to restaurant's server or to the customer's mobile device. The restaurant's server or the mobile device processes the purchase and payment for the food and drink consumed with a payment service provider. Further, the restaurant's server or the mobile device may analyze the nutritional information embedded in the RFID tags attached to the drinks or food items and notify the customer of the summary of the nutritional information of the dinner.

Thus, the RFID placemat may keep track of the food and drinks consumed by a customer. The RFID placemat may facilitate payment for the food and drinks consumed and provide the customer with the summary of nutritional information for the meal. Thus, the waiter at the restaurant no longer needs to spend time and effort recording the food or drinks consumed by the customer. Further, the customer does not have to wait to pay for the meal, because the RFID placement allows automatic payment. Accordingly, the RFID placemat provides convenience for the customer and improve customer service at the restaurant.

Figure 7:
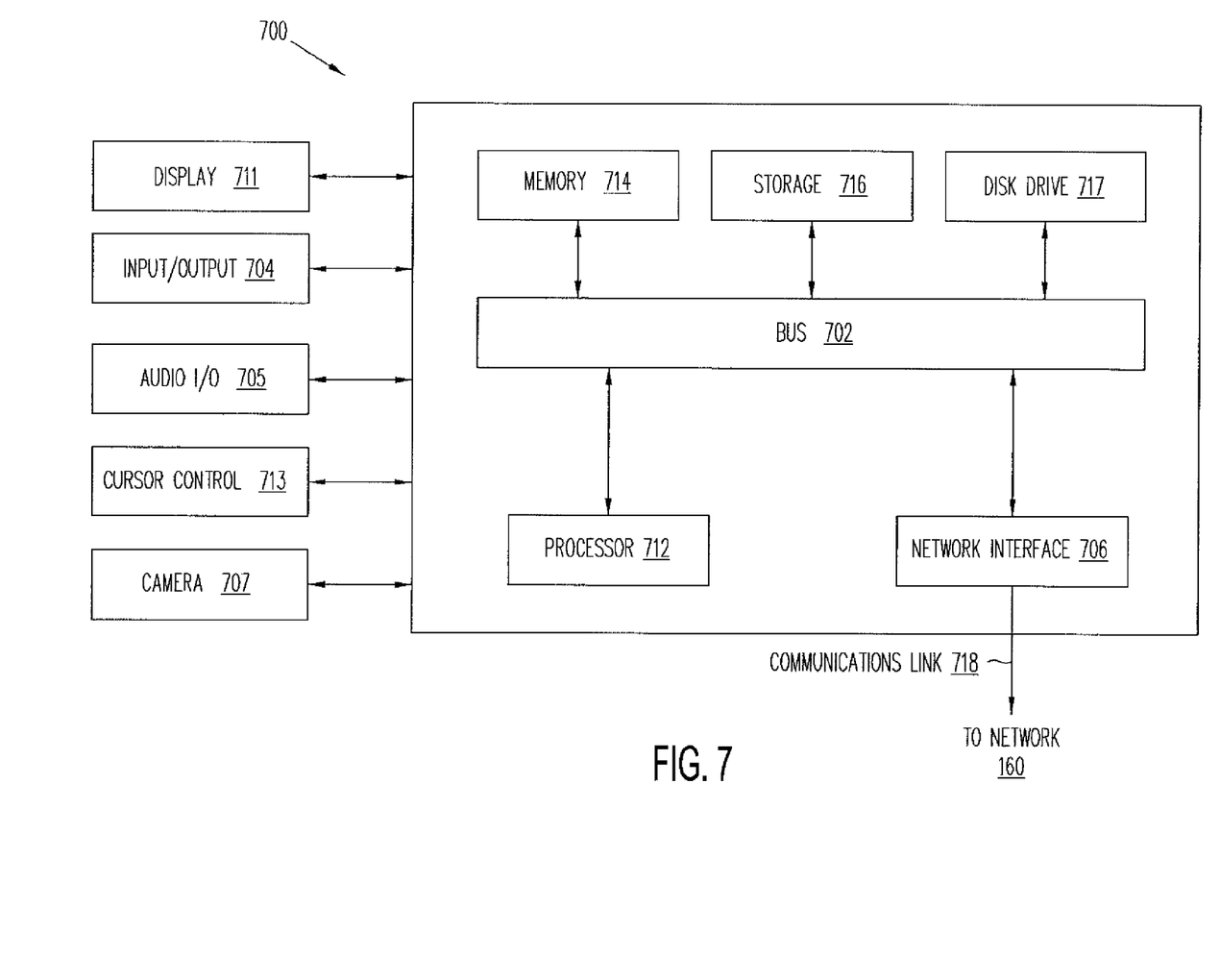
FIG. 7 is a block diagram of a computer system suitable for implementing one or more components in FIG. 1 according to one embodiment.

FIG. 7 is a block diagram of a computer system 700 suitable for implementing one or more embodiments of the present disclosure. In various implementations, user device 110 may comprise a personal computing device (e.g., smart phone, a computing tablet, a personal computer, laptop, PDA, Bluetooth device, key FOB, badge, etc.) capable of communicating with the network. Merchandise holder 120 may include a computer configured to facilitate communication with other devices in network 160 and implement detection and reading of RFID tags. The merchant and/or payment provider may utilize a network computing device (e.g., a network server) capable of communicating with the network. It should be appreciated that each of the devices utilized by users, merchants, and payment providers may be implemented as computer system 700 in a manner as follows.

Computer system 700 may include a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, a merchant server, or a payment provider server via network 160. In one embodiment, the transmission is wireless, although other transmission mediums and methods may also be suitable. A processor 712, which can be a microcontroller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also may include a system memory component 714 (e.g., RAM), a static storage component 716 (e.g., ROM), and/or a disk drive 717. Computer system 700 may perform specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving a merchandise holder profile identifying an association between a merchandise holder and a user, wherein the merchandise holder comprises a Radio Frequency Identification ("RFID") chip and is configured to hold and detect items;
   receiving information of one or more items detected by the merchandise holder in response to the one or more items being placed on the merchandise holder, the information of the one or more items comprising a request for a merchant to provide service to the user;
   transmitting, to a device of the user, the information of the one or more items for display on the device of the user, the information of the one or more items comprising a request for approval of purchasing the one or more items, the request for approval, when approved, initiates payment for the one or more items;
   receiving, from the device of the user to the merchant to provide service to the user, the request for the merchant to provide service to the user when the user approves of the request of purchasing the one or more items and after the payment for the one or more items has completed; and
   facilitating a payment transaction that initiates payment for the one or more items based on the information for the one or more items detected by the merchandise holder when the user approves of the request of purchasing the one or more items on the device of the user.

2. The system of claim 1, wherein the RFID chip is configured to detect RFID tags attached to the one or more items, and
   wherein the information of one or more items are stored in the RFID tags attached to the one or more items and include identification information of the one or more items, prices of the one or more items, and nutritional information of the one or more items.

3. The system of claim 1,
   wherein the RFID chip is configured to detect RFID tags attached to the one or more items,
   wherein the information of one or more items are stored in the RFID tags attached to the one or more items and include identification information of the one or more items and prices of the one or more items, and
   wherein the operations further comprise calculating a total price based on the prices of the one or more items.

4. The system of claim 3, wherein the payment transaction is processed with a payment provider based on the calculated total price.

5. The system of claim 1,
   wherein the RFID chip is configured to detect RFID tags attached to the one or more items,
   wherein the information of one or more items are stored in the RFID tags attached to the one or more items and include identification information of the one or more items and nutritional information of the one or more items,
wherein the operations further comprise calculating a nutritional summary based on the nutritional information of the one or more items, and
wherein the nutritional summary includes a total alcohol amount or a total calorie amount.

6. The system of claim 1,
wherein the RFID chip is configured to detect RFID tags attached to the one or more items, and
wherein the one or more items are beverages stored in beverage containers with the RFID tags disposed in the beverage containers.

7. The system of claim 1,
wherein the RFID chip is configured to detect RFID tags attached to the one or more items, and
wherein the one or more items are food items stored in food containers with the RFID tags disposed in the food containers.

8. The system of claim 1, wherein the operations further comprise receiving a photo of the user from the merchandise holder in response to the request to provide service.

9. The system of claim 1, wherein the operations further comprise sending a confirmation notification to the device of the user, the confirmation notification notifying the user that a purchased order of the one or more items has been received and completed and that the purchased one or more items will be delivered to the user.

10. A method for facilitating purchase using a merchandise holder, the method comprising:
receiving a merchandise holder profile identifying an association between a merchandise holder and a user of a payment account, wherein the merchandise holder comprises an RFID chip and is configured to hold and detect items;
receiving information of one or more items detected by the merchandise holder in response to the one or more items being placed on the merchandise holder, the information of the one or more items comprising a request for a merchant to provide service to the user;
transmitting, to a device of the user, the information of the one or more items for display on the device of the user, the information of the one or more items comprising a request for approval of purchasing the one or more items, the request for approval, when approved, initiates payment for the one or more items;
receiving, from the device of the user to the merchant to provide service to the user, the request for the merchant to provide service to the user when the user approves of the request of purchasing the one or more items and after the payment for the one or more items has completed; and
facilitating a payment transaction that initiates payment for the one or more items based on the information for the one or more items detected by the merchandise holder when the user approves of the request of purchasing the one or more items on the device of the user.

11. The method of claim 10,
wherein the RFID chip is configured to detect RFID tags attached to the one or more items, and
wherein the information of one or more items are stored in the RFID tags attached to the one or more items and include identification information of the one or more items, prices of the one or more items, and nutritional information of the one or more items.

12. The method of claim 10,
wherein the RFID chip is configured to detect RFID tags attached to the one or more items,
wherein the information of one or more items are stored in the RFID tags attached to the one or more items and include identification information of the one or more items and prices of the one or more items, and
wherein the method further comprises:
calculating a total price based on the prices of the one or more items.

13. The method of claim 12, wherein the payment transaction is processed with a payment provider based on the calculated total price.

14. The method of claim 10,
wherein the RFID chip is configured to detect RFID tags attached to the one or more items,
wherein the information of one or more items are stored in the RFID tags attached to the one or more items and include identification information of the one or more items and nutritional information of the one or more items,
wherein the method further comprises calculating a nutritional summary based on the nutritional information of the one or more items, and
wherein the nutritional summary includes a total alcohol amount or a total calorie amount.

15. The method of claim 10,
wherein the RFID chip is configured to detect RFID tags attached to the one or more items, and
wherein the one or more items are beverages stored in beverage containers with the RFID tags disposed in the beverage containers.

16. The method of claim 10,
wherein the RFID chip is configured to detect RFID tags attached to the one or more items, and
wherein the one or more items are food items stored in food containers with the RFID tags disposed in the food containers.

17. A merchandise holder comprising:
a surface configured to hold an item attached with a Radio Frequency Identification (RFID) tag;
an RFID detecting device configured to detect the RFID tag attached to the item when the item is placed on the top surface and read information related to the item included in the RFID tag; and
a communication device configured to send the information related to the item to a device of a user, the information related the item being for display on the device of the user, the information related the item comprising a request for approval of purchasing the item, the request for approval, when approved, initiates payment for the one or more items,
wherein the communications device is further to receive, from the device of the user to the merchant to provide service to the user, the request for the merchant to provide service to the user when the user approves of the request of purchasing the item and after the payment for the one or more items has completed,
wherein the communications device is further to send the information related to the item to a device configured to facilitate a payment transaction for the item when the user approves of the request of purchasing the item on the device of the user and initiates payment for the one or more items, and
wherein the communications device is further to send a notification to a merchant associated with the device when the user approves of the request of purchasing the item and after the payment for the one or more items has completed.

18. The merchandise holder of claim 17, wherein the RFID detecting device is disposed below a top surface of the surface and has a detection direction toward the top surface and a detection range reaching above the top surface.

19. The merchandise holder of claim 17, wherein the information related to the item include an identification of the item, a price of the item, and a nutritional content of the item.

20. The merchandise holder of claim 17, wherein the item is an advertisement of a beverage held in a beverage container and the RFID tag is attached to a bottom side of the item.

21. The merchandise holder of claim 17, wherein the item is an advertisement of a food item held in a food container and the RFID tag is attached to a bottom side of item.

22. The merchandise holder of claim 17, wherein the merchandise holder is associated with a payment account of a user, and
    wherein the action is a payment transaction processed using the payment account of the user.

23. The merchandise holder of claim 17, wherein the item comprises an advertisement of a merchandise.

\* \* \* \* \*